United States Patent [19]

Turner et al.

[11] Patent Number: 4,848,137

[45] Date of Patent: Jul. 18, 1989

[54] AUTOMATED SHIM MANUFACTURING SYSTEM

[75] Inventors: C. Warren Turner, Auburn; Larry L. Trammell, Federal Way; Albert L. Hametner, Seattle, all of Wash.

[73] Assignee: The Boeing Company, Seattle, Wash.

[21] Appl. No.: 172,005

[22] Filed: Mar. 23, 1988

[51] Int. Cl.[4] .................. G01D 18/00; G05D 5/03; G05D 5/06

[52] U.S. Cl. .................. 73/1 J; 364/474.02; 364/474.22; 364/474.37

[58] Field of Search .............. 73/1 J; 364/474, 475; 409/118, 120, 127, 131, 125

[56] References Cited

U.S. PATENT DOCUMENTS

| | | | |
|---|---|---|---|
| 2,933,985 | 4/1960 | Zwick et al. | 90/13 |
| 3,121,370 | 2/1964 | Larsen | 90/13.5 |
| 3,200,712 | 8/1965 | Jenkins | 90/62 |
| 3,340,772 | 9/1967 | Weaver | 90/13 |
| 3,932,923 | 1/1976 | DiMatteo | 29/407 |
| 4,031,669 | 6/1977 | Koide et al. | 51/142 |
| 4,118,871 | 10/1978 | Kirkham . | |
| 4,142,401 | 3/1979 | Nilson | 73/1 J X |
| 4,224,670 | 9/1980 | Yamazaki | 364/474 |
| 4,226,147 | 10/1980 | Kumzi | 364/475 X |
| 4,296,473 | 10/1981 | Imazeki et al. | 364/520 |
| 4,334,272 | 6/1982 | Imazeki et al. | 364/474 |
| 4,337,566 | 7/1982 | DiMatteo et al. | 29/558 |
| 4,355,447 | 10/1982 | DiMatteo et al. | 29/26 |
| 4,356,552 | 10/1982 | Imazeki et al. | 364/474 |
| 4,382,215 | 5/1983 | Barlow et al. | 318/568 |
| 4,394,608 | 7/1983 | Tryber et al. | 318/578 |
| 4,412,295 | 10/1983 | Imazeki et al. | 364/520 |
| 4,424,570 | 1/1984 | Imazeki et al. | 364/520 |
| 4,456,962 | 6/1984 | Imazeki et al. | 364/520 |
| 4,467,432 | 8/1984 | Imazeki et al. | 364/474 |
| 4,484,293 | 11/1984 | Minucciani et al. | 364/513 |
| 4,486,840 | 12/1984 | Klein et al. | 364/474 |
| 4,575,805 | 3/1986 | Moermann et al. | 364/475 X |
| 4,603,285 | 7/1986 | Matsuura et al. | 318/578 |
| 4,630,215 | 12/1986 | Graham, Jr. | 364/474 |
| 4,638,232 | 1/1987 | Stridsberg et al. | 364/474 X |
| 4,649,752 | 3/1987 | Turner | 73/760 |

Primary Examiner—Tom Noland
Attorney, Agent, or Firm—Christensen, O'Connor, Johnson & Kindness

[57] ABSTRACT

A system for automatically manufacturing shims for use between the structural components of an airframe is disclosed. The system includes: a calibration system (53) for evaluating the accuracy of the measurements made by shim gap probes (87) and producing related calibration coefficients; one or more data acquisition units (55) for measuring shim gaps (41) using calibrated shim gap probes (87); a cell controller (57) for producing machine tool numerical control instructions based on shim gap probe measurements; and, one or more numerically controlled machine tools (59) for manufacturing shims based on said numerical control instructions.

42 Claims, 13 Drawing Sheets

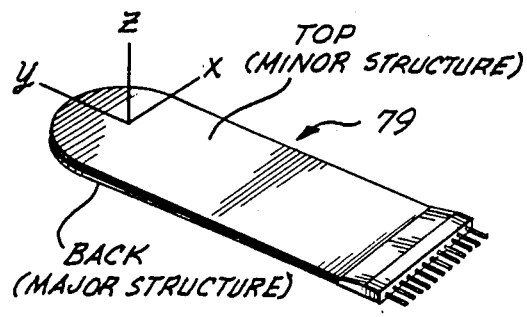
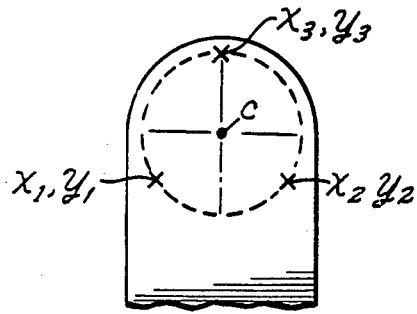
Fig. 5. PRIOR ART
Fig. 6. PRIOR ART
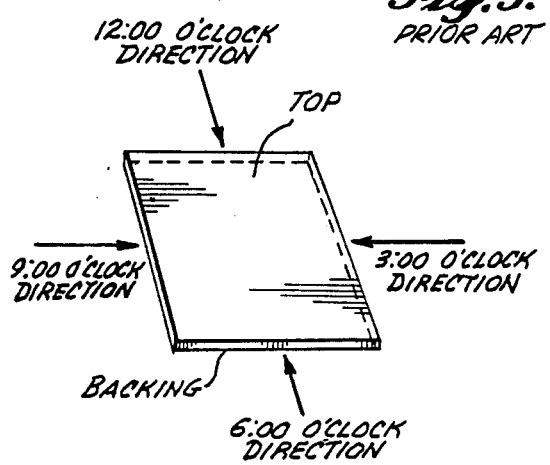
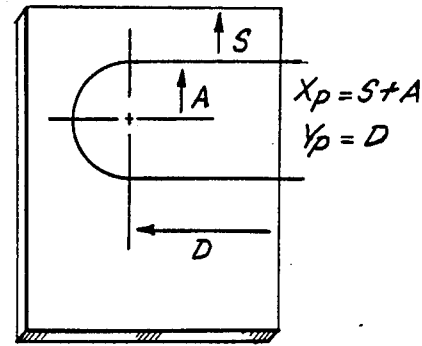
Fig. 12.
Fig. 13.
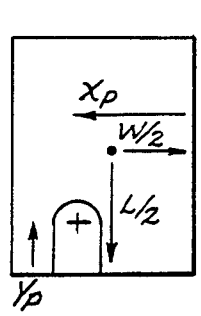
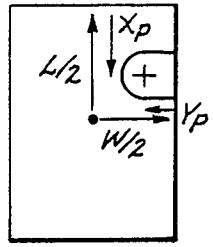
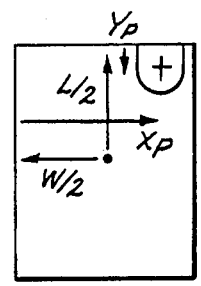
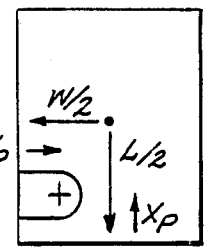
Fig. 14A.   Fig. 14B.   Fig. 14C.   Fig. 14D.

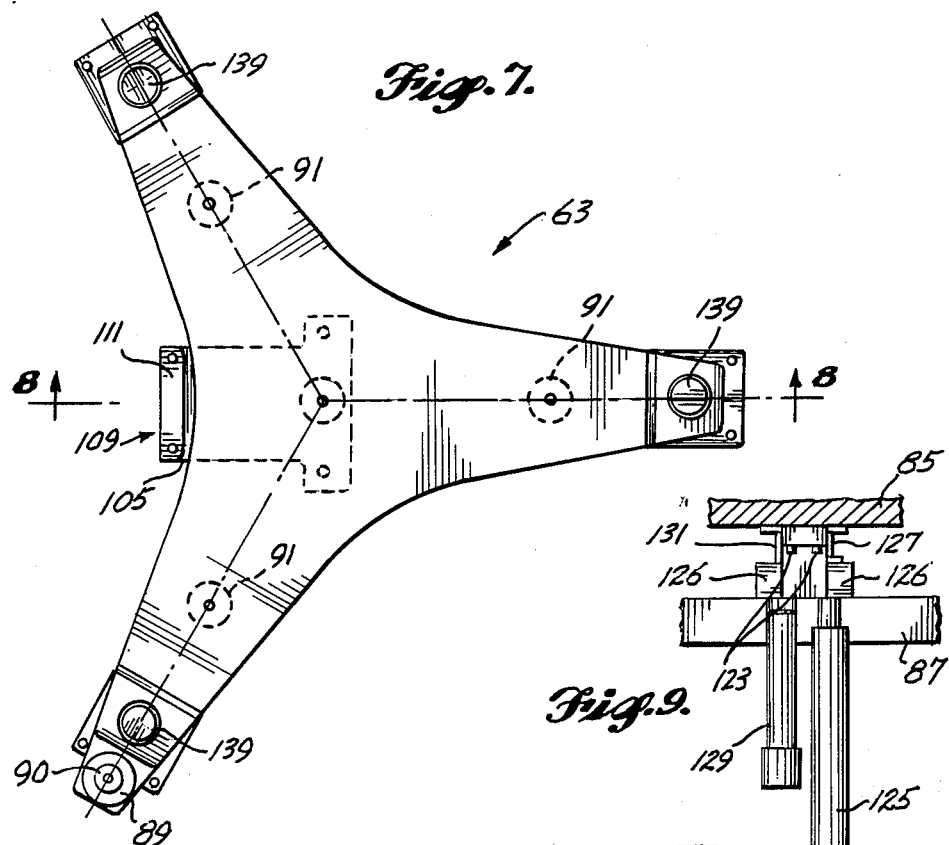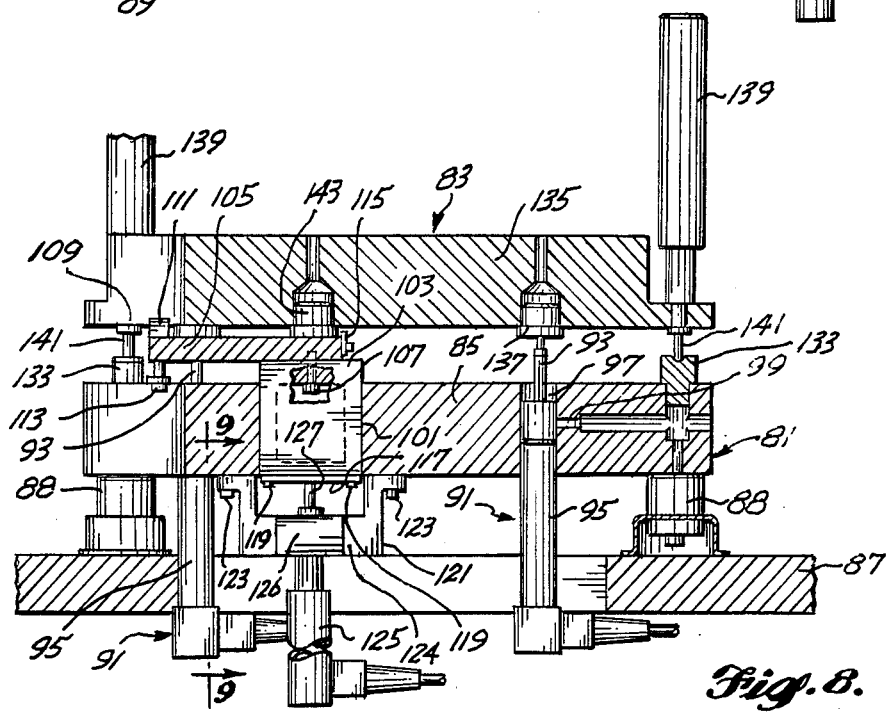

3:00 = OUTB'D
6:00 = DOWN
BACKING = AFT

3:00 = INB'D
6:00 = DOWN
BACKING = FWD

AUTOMATED SHIM MANUFACTURING SYSTEM

TECHNICAL AREA

This invention relates to machine tools and, more particularly, numerically controlled machine tools.

BACKGROUND OF THE INVENTION

All current aircraft manufacturing techniques require structural shimming at interface surfaces between structural components, such as frames, stringers, spars, etc. where tolerance buildup prevents net-line fits. The current technique is to hand-cut laminated shim material to create a shim sized to fill the gap between the interfacing surfaces. After shim beveling is completed, the shim profile is trimmed with an aircraft shears. Because this technique is timeconsuming and labor-intensive, it is expensive. Another disadvantage of this technique is its dependence on the skill of the person that manufactures the shim, which varies from individual to individual.

Various proposals have been made to overcome the disadvantages of the foregoing technique. One proposal has been to form shim master molds and use the molds to create master shims. While useful in some situations, this technique is not useful in others, particularly where the gap to be filled by the shim is very narrow. Further, master mold shims have to be hand-tailored for each individual interface situation, which is undesirable because it is expensive and creates a large inventory of master molds.

Recently, a probe for use in determining the thickness of an interface gap, i.e., a gap between two facing components, has been developed. The probe is described in U.S. Pat. No. 4,649,752 entitled "Shim Gap Probe," which is assigned to the assignee of the present invention. The subject matter of U.S. Pat. No. 4,649,752 is incorporated herein by reference. The probe described in U.S. Pat. No. 4,649,752 includes a wavespring formed in one end of a thin, flat, elongate piece of resilient material, such as spring steel. The wavespring includes at least three sinusoidal waves having a peak-to-peak separation that is greater than the maximum thickness of the gaps to be measured. Mounted on the wavespring, at the bottom of the concave depressions formed by each of the sinusoids, are strain gauge sensors. Each depression supports at least two strain sensors oriented to sense the radial and circumferential strain applied to the wavespring when the wavespring is positioned in an interface gap. The strain sensors in each depression are combined to form strain gauge bridges. In a conventional manner, the strain sensors control the magnitude of electric signal flow through the bridges to provide a measure that is indicative of the compression of the wavespring and, thus, the thickness of the gap. The use of at least three sinusoids provides two-dimensional taper, as well as thickness information since three precisely positioned, spaced apart thickness measurements are created.

The present invention is directed to an automatic shim manufacturing system that utilizes the shim gap information generated by a shim gap probe, preferably a shim gap probe of the type described in U.S. Pat. No. 4,649,752, to control the manufacturing of shims and, thereby, avoid the disadvantages associated with the hand manufacture and master mold techniques discussed above.

SUMMARY OF THE INVENTION

In accordance with this invention, a system for automatically manufacturing shims for use in the gaps between the interface surfaces of structural components, particularly the gaps between the interface surfaces of the structural components of an airframe, is provided. The system includes: one or more data acquisition units for measuring shim gaps using calibrated shim gap probes; a controller for producing machine tool numerical control instructions based on said shim gap probe measurements; and, one or more numerically controlled machine tools for manufacturing shims based on said numerical control instructions.

In accordance with other aspects of this invention, the system also includes a calibration subsystem for calibrating the shim gap probes by determining the accuracy of the measurements made by the shim gap probes and producing calibration coefficients for correcting measurements made by the shim gap probes.

In accordance with further aspects of this invention, the calibration subsystem includes a rigid, horizontally oriented base plate and a rigid, horizontally oriented upper plate that overlies the base plate and is separated therefrom by a small gap. Preferably, the rigid horizontally oriented upper plate has three corners, each supported by linear actuators whose positions control the tilt of the upper plate. Also, preferably, the tilt position of the upper plate is detected by suitably positioned linear position sensors. Located in the space between the upper and base plates is a horizontal stage. More specifically, the horizontal stage is supported by the rigid, horizontally oriented base plate. Preferably, the horizontal stage is raised and lowered by a linear actuator and the vertical position of the stage is detected by a linear position sensor. After a probe to be calibrated is mounted atop the horizontal stage, the horizontal stage is raised and the upper plate is lowered and tilted into various positions. The shim gap probes is exercised by a combination of tilting the upper plate and vertically displaying the horizontal stage. The end result is a series of parallel offsets for each slope gradient. Measurements made by the shim gap probe at the chosen positions are used to calibrate the shim gap probe, i.e., produce the calibration coefficients.

In accordance with further aspects of this invention, the upper plate includes three equally spaced apart horizontal legs extending outwardly from a center. The center of the upper plate is located above the center of a shim gap probe positioned atop the horizontal stage. The upper plate is entirely supported at the outer end of the horizontal legs by vertically oriented linear actuators mounted such that the extension and retraction of the movable elements of the linear actuators controls the tilt position of the upper plate.

In accordance with still other aspects of this invention, the data acquisition units include a control display unit (CDU) via which an operator communicates data to the controller that is used in conjunction with the probe gap measurement data to produce the numerical control instructions. The data communicated to the controller via the CDU includes: (i) depth and shift values that define the position of a shim gap probe in a gap being measured; and, (ii) the clock orientation direction of the probe. The controller includes stored data defining the profiles of shims to be used at different locations. This data is accessed based on information entered by the operator via the CDU. More specifically, the CDU prompts the operator to input the relational data required for the data base to uniquely identify the shim site at which the operator will take a measurement. The prompts may include the side of the aircraft (left or right), the type of element to be shimmed (spar or strut), front or rear locations, a site number, a station number, etc.

Based on probe gap measurement data, stored data and operator data, the controller determines the depth of cut at a shim blank reference point location, preferably the center of the shim blank. The controller further determines a tilt angle that defines the inclination of the shim and a rotation angle that relates the tilt angle to a particular axis. In essence, the rotation angle rotates the shim profile so that, with respect to the shim blank, the shim gradient tilt angle lies along a single axis rather than along dual axes. The controller utilizes the depth of cut, rotation angle and tilt angle data to generate numerical control instructions for controlling the numerically controlled machine tool.

In accordance with yet further aspects of this invention, the numerically controlled machine tool includes a cutter suspended over a tilt table. A shim blank is mounted in the center of the tilt table and clamped into position. Preferably, the shim blank is clamped in position by hydraulic clamps backed up by a pneumatic suction system that rigidly adheres the shim blank to a manifold that lies atop the tilt table. Thereafter, based on the numerical control instructions generated by the controller, the tilt table is tilted to the calculated tilt angle and the shim face is cut in a conventional manner by moving the cutter back and forth across the shim blank, in the region between the clamps. After the shim blank is face milled, the profile of the shim is cut based on predeveloped contour information related to the interface where the shim is to be installed. Preferably, the shim blank includes a base layer and a shim layer adhesively attached to the base layer. The use of such blanks allow the cutter to cut a portion of the base layer when forming the profile of the shim. As a result, the shim can remain attached to the base layer until needed.

In accordance with yet still other aspects of this invention, the system includes a printer that prints a label containing relevant information, such as aircraft number, shim location, operator data, etc. After the shim is cut, the label is attached to the face of the shim.

As will be readily appreciated from the foregoig summary, the invention provides an automated shim manufacturing system that is ideally suited for precisely manufacturing shims for use in the gaps between the interface surfaces of structural components, in particularly the gaps between the interface surfaces of the structural components of an airframe. Gap measurements made by a twodimensional taper shim gap probe are mathematically converted into instructions suitable for controlling a numerically controlled machine tool in a precise manner.

BRIEF DESCRIPTION OF THE DRAWINGS

The foregoing and other features and advantages of this invention will become more readily appreciated as the same becomes better understood by reference to the following detailed description when taken in conjunction with the accompanying drawings wherein:

FIG. 5 is a pictorial view of a shim gap probe suitable for use in embodiment of the invention illustrated in FIGS. 3 and 4;

FIG. 6 is a plan view illustrating the location of the measurement points of the shim gap probe illustrated in FIG. 5;

FIG. 7 is a top plan view of a calibration table suitable for use in the embodiment of the invention illustrated in FIGS. 3 and 4;

FIG. 8 is a cross-sectional elevational view of the calibration table illustrated in FIG. 7 taken along line 8—8;

FIG. 9 is a cross-sectional view of a portion of the calibration system illustrated in FIGS. 7 and 8 taken along line 9—9 of FIG. 8;

FIG. 12 is a pictorial view of a shim blank and nomenclature that defines the surfaces of the blank;

FIG. 13 is a pictorial view of a shim gap probe of the type illustrated in FIG. 5 overlying a shim blanks showing certain mathematical relationships therebetween;

FIGS. 14A-D is a set of pictorial diagrams illustrating the interrelationship between the position of a shim gap probe and a reference point on the major surface of a shim blank;

DESCRIPTION OF THE PREFERRED EMBODIMENT

Figure 1:
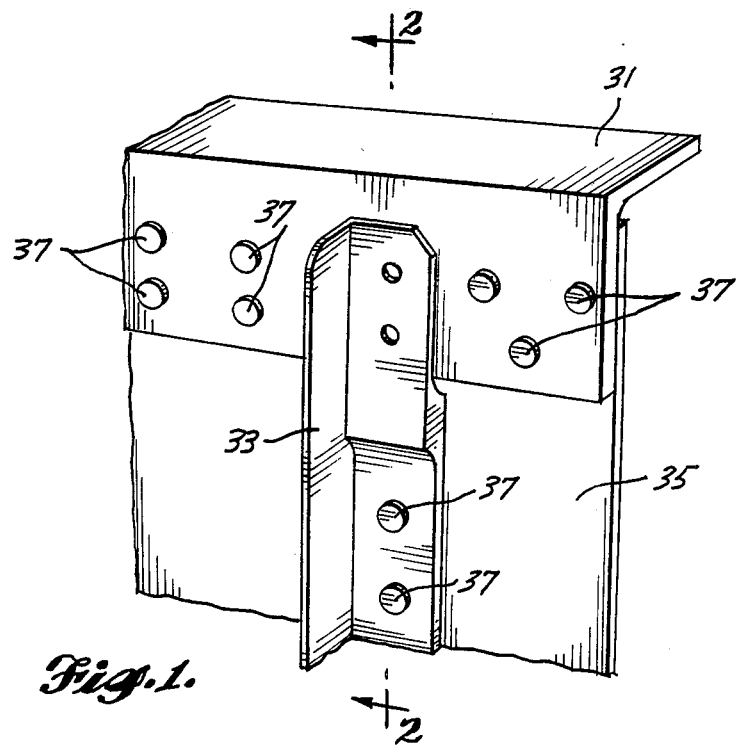
FIG. 1 is a pictorial diagram illustrating the intersecting surfaces of two structural elements of an airframe.

FIG. 1 is a pictorial view of a junction between a pair of airframe structural elements, namely a wing spar chord 31 and a wing stiffener 33. The stiffener 33 is shown as orthogonally intersecting the chord 31. The stiffener 33 has an L-shaped cross-sectional configuration and is oriented such that the outer surface of one end of the flange overlies a surface of the chord 31, which is also L-shaped. While not relevant to the present invention, in a conventional manner, a wing web 35 is attached to the chord 31 and stiffener 33 by suitable fasteners 37, such as lock bolts.

Figure 2:
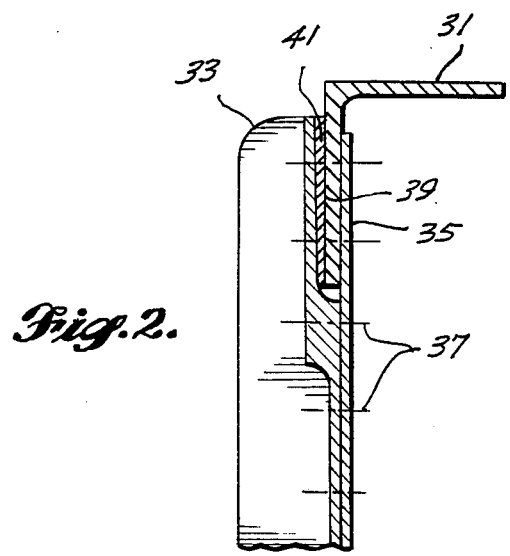
FIG. 2 is a cross-sectional view along line 2—2 of FIG. 1.

As shown in FIG. 2, while the stiffener 33 overlies the spar chord 31, these components do not lie flat against one another. Rather, a tapered gap 39 exists between the chord 31 and the stiffener 33. In order to snugly attach the overlying flange of the stiffener 33 to the chord 31, it is necessary to fill the gap 39 with a shim 41. As discussed above, in the past, shims have been formed by hand. This invention is directed to a manufacturing system for automatically manufacturing shims 41 suitable for use in gaps 39 of the type illustrated in FIG. 2. While FIG. 2, in essence, shows a wedge-shaped gap that appears to taper in a single direction coincident with the longitudinal axis of the stiffener 33, it is to be understood that frequently such gaps are compound, i.e., the taper has directional components along the longitudinal axes of both of the intersecting components, i.e., the chord 31 and the stiffener 33.

Figure 3:
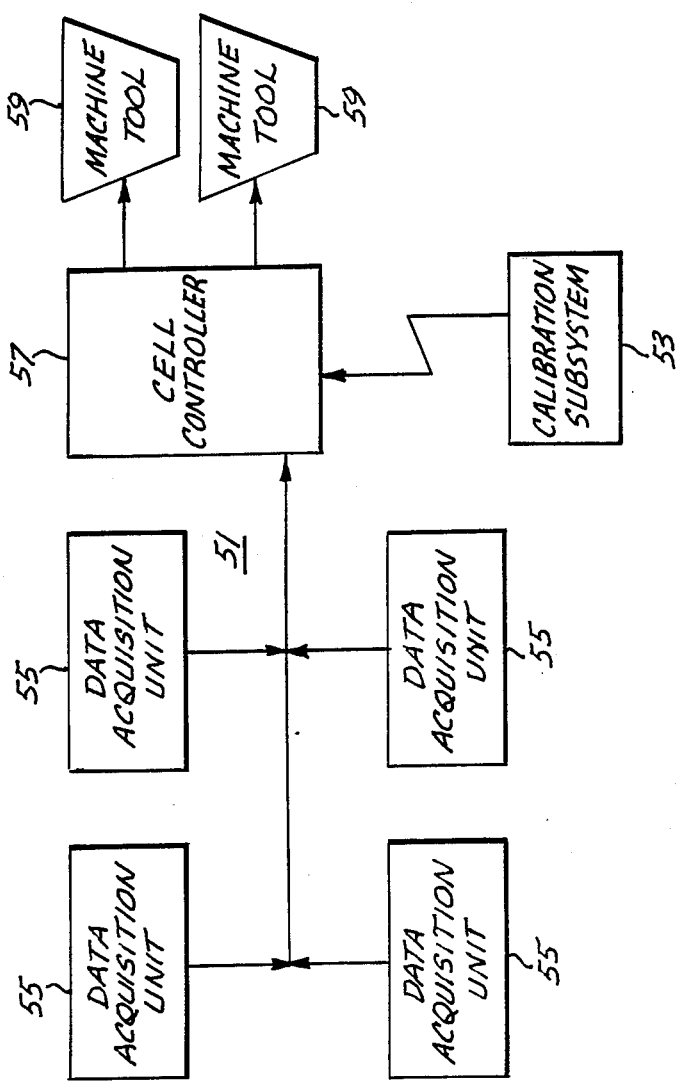
FIG. 3 is a block diagram of an automated shim manufacturing system formed in accordance with the invention.

FIG. 3 is a block diagram of an automated shim manufacturing system 51 formed in accordance with the invention. The automated shim manufacturing system 51 illustrated in FIG. 3 comprises: a calibration subsystem 53; one or more data acquisition units 55; a cell controller 57; and, one or more numerically controlled machine tools 59. The cell controller 57 receives: shim gap probe calibration data from the calibration subsystem 53; and, shim gap probe measurement data from the data acquisition units 55. Based on the shim gap probe calibration and measurement data, stored data and data supplied to the cell controller by an operator via a suitable control display unit (CDU) that forms part of the data acquisition unit(s), the controller 57 produces numerical control signals that control the operation of the numerically controlled machine (tool(s) 59 in a manner that produces shims suitable for use in filling gaps of the type illustrated in FIG. 2 and described above. In this regard, as will be readily appreciated by those familiar with producing shims for aircraft assemblies, each shim site is unique, whereby each shim is unique. More specifically, each shim is unique because shim thickness and slope vary from site to site. Even the same site on different assemblies have different shim thickness and slope values.

Figure 4:
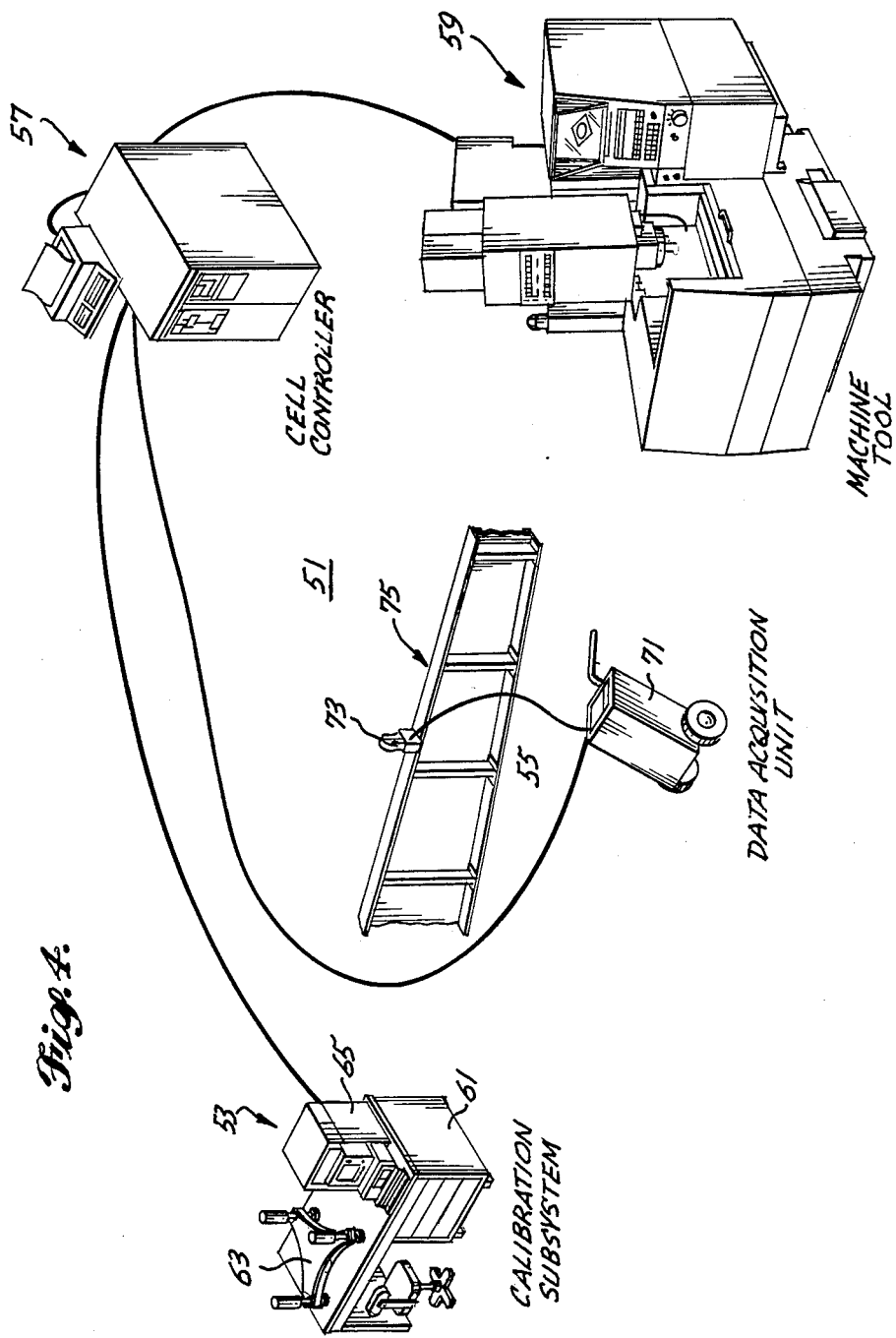
FIG. 4 is a pictorial diagram of an automated shim manufacturing system formed in accordance with the invention.

FIG. 4 is a pictorial diagram of an automated shim manufacturing system 51 formed in accordance with the invention. For purposes of drawing simplicity, the automated shim manufacturing system illustrated in FIG. 2 only includes a single data acquisition unit 55 and a single numerically controlled machine tool 59. The calibration subsystem 53 includes: a work bench 61 that supports a calibration table 63 illustrated in FIGS. 7-9 and described below; and, a control unit 65, which may take the form of a microprocessor and associated components, for controlling the operation of the calibration table 63 and communicating with the cell controller 57. The data transmitted from the control unit 65 to the cell controller 57 contains each probes' physical characteristics, such as gage location coordinates, gage reference voltages, and other relevant data, as well as calibration data in the form of calibration coefficients for characteristics equations (described below).

The data acquisition unit 55 includes a cart 71 and a probe storage housing 73. The probe storage housing 73 is, preferably, designed to be clamped to the assembly of components 75 whose gaps are to be measured. The probe storage housing 73 thus provides a convenient place for storing a shim gap probe during nonuse so that the rather delicate shim gap probe is protected. Further, the probe storage housing 73 provides strain relief between the shim gap probe and the data acquisition unit 71 that receives the measurements made by the shim gap probe. Strain relief is provided by connecting, inside the shim gap probe storage housing 73, a heavier cable to the delicate wires connected to the shim gap probe, so that the housing 73 and the assembly 74 support most of the cable weight. In addition to receiving data from the ship gap probe via the cable running to the probe storage housing 73 and sending the data to the cell controller 57, the cart 71 also includes a control display unit (CDU), which allows an operator to send pertinent information, such as gap identity information, aircraft identity number, etc., to the cell controller 57. The cell controller uses the identity information to produce an identification label suitable for application to a completed shim after the shim is manufactured by the numerically controlled machine tool 59 or to a shim blank prior to manufacture. While various numerically controlled machine tools can be utilized to create shims, the presently preferred machine tool is a MAZAK VQC 15/40 three axis, vertical spindle, high-speed milling machine with a fourth axis rotary table option and a MAZAK M-2 controller produced by the Yamazaki Machine Works Ltd., 1 Norifuni, Oguchi-Cho, Niwa-Gun, Aichi Pref., Japan.

FIG. 5 is a pictorial diagram of the presently preferred shim gap probe 79. Since this probe is described in U.S. Pat. No. 4,649,752, entitled "Shim Gap Probe" and assigned to the assignee of the present invention, which patent is incorporated herein by reference, the nature and operation of the shim gap probe 79 is not described here in detail. In general, the shim gap probe 79 includes a wavespring formed in one end of a thin, flat, elongate piece of resilient material sandwiched between a pair of protective covers also formed of thin, flat, elongate pieces of resilient material, preferably steel. The wavespring includes at least three sinusoidal waves having a peak-to-peak separation that is greater than the maximum thickness of the gaps to be measured. Mounted on one side of the wavespring, at the bottom of the concave depressions formed by each of the sinusoids, are strain gauge sensors. Each depression supports at least two strain gauge sensors oriented to sense the radial and circumferential strain applied to the wavespring when the wavespring is positioned in an interface gap. The strain sensors are combined to form strain gauge bridges. In a conventional manner, the strain sensors control the magnitude of electrical signal flow through the bridges to provide a measurement that is indicative of the compression of the wavespring and, thus, the thickness of the gap. The use of at least three sinusoids provides two-dimensional taper data, as well as thickness data, since three precisely positioned, spaced apart thickness measurements are created. For reference purposes, one of the surfaces of the shim gap probe 79 is defined as the back side and the other is defined as the top side. When used, the shim back probe is positioned such that the back side rests against the major structure side of the gap being measured and the top side rests against the minor structure side of the gap.

As illustrated in FIG. 6 the locations of the three strain sensors can be defined as: $x_1$, $y_1$; $x_2$, $y_2$; and $x_3$, $y_3$ positions of a two-dimensional cartesian coordinate system. The strain sensors are equally positioned about the circumference of a circle having a center, C,. defined by the wavespring. The center or C position is defined as the origin, or $x_0$, $y_0$ position of the cartesian coordinate system. Preferably, one of the sensors, specifically the sensor positioned at $x_3$, $y_3$, lies along one of the longitudianl axes of the probe, preferably the y axis. This results in the normalized x, y sensor positions having the following exemplary values:

$x_1 = 0.3248$, $y_1 = -0.1875$ $x_2 = 0.3248$, $y_2 = -0.1875$ $x_3 = 0.0000$, $y_3 = 0.3750$.

While shim gap probes of the type illustrated in FIGS. 5 and 6 and described in U.S. Pat. No. 4,649,752 are highly accurate, measurements made by such probes vary from probe to probe. As a result, it is necessary to calibrate such probes prior to use. In accordance with this invention, probe calibration is accomplished by the calibration subsystem illustrated in FIG. 4 and described above, i.e., a calibration subsystem that includes a calibration table 63 in combination with a control unit 65. The control unit provides a vehicle via which an operator can control the calibration table and via which calibration data and other relevant, data, such as probe identification data, can be communicated to the cell controller 57. FIGS. 7-9 illustrate a calibration table 63 suitable for use in the calibration subsystem illustrated in FIG. 4.

The calibration table 63 illustrated in FIGS. 7-9 includes a base plate assembly 81 and an upper plate assembly 83. The base plate assembly 81 includes a rigid base plate 85, preferably formed of a thick piece of stress relieved steel. As best seen in FIG. 7, the base plate 85 is generally Y-shaped, i.e., the base plate 85 has three equally spaced apart, outwardly extending horizontal legs. The outer end of each of the outwardly extending legs is attached to the top 87 of the work bench 61 (FIG. 4) by a shock absorbing mounting assembly 88. Located on the upper surface of one of the legs 89 of the base plate 85 is a level, preferably a two-axis bubble level 90. The base plate 85 is leveled by either adjusting the height of the legs of the work bench 61, or by constructing the shock absorbing mounting assemblies 88 in a manner that allows them to be height adjusted.

Vertically mounted in each of the legs of the base plate is a linear gauge 91. One suitable linear gauge is the DG-2025 digital linear gauge produced by Sony Magnascale, Toyo Building 9-17, Nishigotandu 3 Chrome, Shinagawa Ku, Tokyo, 141, Japan. The linear gauges 91. are located inwardly from the outer ends of the legs of the base plate 85 and lie along the central axis of the legs, as illustrated in FIG. 7. Each of the linear gauges 91 includes a vertically oriented rod 93. In a conventional manner, the amount of rod extension defines a linear position. The housings 95 of the linear gauges 91 are mounted in vertical holes 97 formed in the base plate 85. The gauge housings are held in position by set screws 99 mounted in orthogonal (e.g., horizontal) threaded apertures formed in the legs of the base plate 85. The probe housings 95 are oriented such that the rods 93 extend vertically upwardly.

Slidably mounted in a vertical hole 101 formed in the center of the base plate 85 is a hollow piston 103. Attached to the top of the piston 103 by a cap screw 107 that extends upwardly from the hollow interior of the piston is a shim gap probe support plate 105. The shim gap probe support plate 105 projects outwardly, between two of the legs of the base plate 85, as illustrated in FIG. 7. Located at the outer end of the shim probe support plate 105 is a clamp assembly 109. The clamp assembly 109 includes a bar 111 mounted atop the shim gap probe support plate, near the outer end thereof, and oriented to lie orthogonal to the longitudinal axis of the shim gap probe support plate 105. The bar 111 is attached to the shim gap probe support plate 105 by spring-loaded bolt assemblies 113 that extend vertically through the shim gap probe support plate 105. As a result, the bar 111 can be rasied to create a gap through which a shim gap probe can be slid. The shim gap probe is slid inwardly until the end of the shim gap probe in which the wavespring is located impinges on an inner stop 115. When in this position the center, C, of the wavespring is vertically aligned with the center of the piston 103.

The lower end of the hollow interior of the piston 103 is enclosed by a cap 117. The cap is attached to the piston by cap screws 119. Attached to the base plate 85, beneath the piston 103, is a U-shaped bracket 121. The U-shaped bracket 121 includes outwardly extending, horizontal flanges that are attached to the bottom surface of the base plate 85 by bolts 123. The U-shaped bracket 121 is positioned such that its cross leg 124 lies directly beneath the piston 103. As shown in FIG. 9, the cross leg 124 of the U-shaped bracket is wider than the side legs, i.e., the cross leg 124 includes outwardly extending flanges 126.

Vertically mounted in the cross leg 124 of the U-shaped bracket 121 is a linear actuator 125. The linear actuator is oriented such that the end of its shaft 127 is positioned to impinge on the cap 117 attached to the bottom of the piston 103. As a result, when the linear actuator 125 is actuated such that its shaft 127 moves in one direction or the other, the piston 103 is raised or lowered. As illustrated in FIG. 9, located adjacent to the linear actuator 125 is a linear gauge 129. The linear gauge is vertically oriented and positioned such that the end of the linear gauge's rod 131 impinges on the cap 117 attached to the bottom of the piston 103. As a result, the linear gauge provides a measurement of the position of the piston 103 as the piston is raised and lowered by the linear actuator 125.

Positioned atop the end of each of the arms of the base plate 85 is a support block 133. The upper surface of one of the support blocks is flat, the upper surface of the second support block includes a V-shaped slot and the upper surface of the third support block includes a conical indentation. The axis of the V-shaped slot is aligned with the conical indentation. As will be better understood from the following discussion, these upper surface configurations allow the upper plate assembly 83 to be tilted without restriction while maintaining the upper and base plate assemblies in a known orientation.

The upper plate assembly 83 includes a rigid upper plate 135. Like the base plate 85, the upper plate 135 is preferably formed of a thick piece of stress relieved steel. Also like the base plate, the upper plate 135 is Y-shaped and has three equally spaced apart, horizontally oriented, outwardly extending legs. Further, the upper plate 135 is sized, shaped and oriented such that the legs of the upper plate 135 overlie the legs of the base plate 85. Mounted in the lower surface of each of the legs of the upper plate 135, in a position that overlies a related linear gauge 91 mounted in the base plate 85 in the manner heretofore described, is a cap 137. The caps 137 are formed of a wear-resistant material, such as steel. The ends of the rods 93 of the linear gauges 91 impinge on the caps 137. As a result, the extended position of the linear gauge rods provides a measurement of the distance between the upper and base plates, at the location of each linear gauge.

Mounted in each of the arms of the upper plate 135, at the outer ends thereof, is a vertically oriented linear actuator 139. The shafts 141 of the linear actuators extend downwardly and impinge on an underlying support 133. As a result, the end of one of the linear actuator shafts 141 lies in a cone-shaped indentation, the end of the second linear actuator shaft lies in a V-shaped slot and the end of the third linear actuator shaft impinges on a flat surface. Mounted in the lower surface of the upper plate 135, so as to overlie the wave washer of a shim gap probe positioned atop the shim gap probe support plate 105 in the manner heretofore described, is a further wear-resistant cap 143. Movement of the linear actuators 139 mounted in the upper plate 135 as well as the linear actuator 125 mounted below the piston 103 is controlled by the control unit 65 (FIG. 4). Likewise, the measurement data produced by the linear gauges 95 and 129 is supplied to the control unit 65.

In operation, the linear actuator 125 that controls the piston 103 and the linear actuators 139 that control the spacing between the base plate 85 and the upper plate 135 are energized as necessary to create a gap between the wave washer cap 143 and the shim gap probe support plate 105 adequate to receive the wave washer end of a shim gap probe. Thereafter, the bar 111 is raised and a shim gap probe is slid between the bar and the shim gap probe support plate until the wave washer end of the shim gap probe lies beneath the wave washer cap 143. This position is reached when the wave washer end of the shim gap probe impinges on the stop 115. Thereafter, the piston linear actuator 125 and/or the upper plate linear actuators 139 are energized to close the remaining gap between the wave washer end of the shim gap probe and the wave washer cap and move the calibration system mechanism to a known starting position. Next, the linear actuators 139 mounted in the upper plate 135 are sequentially energized in a manner that tilts the upper plate to various angular positions. The three linear gauges 91 mounted in the legs of the base plate 85 provide tilt position information. Thus, the control unit 65 can be programmed to use closed loop feedback control to control tilt position. At appropriate tilt positions, the shim gap probe measurements are recorded. Thereafter, the piston is displaced and a new set of shim gap probe measurements are recorded. In essence, the probe to be calibrated is exercised by a combination of upper plate tilt plus a series of piston displacements, yielding a series of parallel off sets for each slope gradient. The shim gap probe measurement data in combination with the chosen tilt position and displacement data are used by the control unit 65 to create calibration coefficients designed to calibrate each gauge to optimum measurement accuracy. Since techniques for numerically deriving calibration coefficients from measurements are well known in the instrumentation art, the details of such derivation are not described here. The calibration coefficient and related probe identity data are sent to the cell controller, which stores the data for use in correcting measurements made by the calibrated probe.

As will be readily appreciated from the foregoing brief discussion of FIGS. 5 and 6, a shim gap probe 79 designed to measure taper in two dimensions can be mathematically represented by a set of three contact points. The contact point coordinates $x_1$, $y_1$; $x_2$, $y_2$; and $x_3$, $y_3$ described the locations of the probe contact points relative to a reference plane. Measurements made of the gap at each contact point uniquely define the taper and thickness at the center point, C, about which the three points are clustered. In the case of a shim gap probe of the type illustrated in FIG. 5 and briefly described above, wavespring compression at the reference points determines the gap thickness at the contact point coordinates.

When a gap 39 (FIG. 2) is to be measured, a shimming technician inserts the probe 79 into the gap. The probe 79 measures the thickness of the gap at the three probe contact points and the results are sent by the associated data acquisition unit 55 to the cell controller where there they are analyzed using the previously developed calibration data.

In order for the measurements made by the probe to be meaningful, the cell controller 57 must know how the gap is oriented and how the probe is positioned in the gap. This information is supplied to the cell controller by the shimming technician via the control display unit (CDU) housed in the cart 71. The following is a description of how the information determined by the shimming technician, and how the technician supplied information and known information, is used by the cell controller to create the data needed to control the machine tool so that a shim of the correct taper and profile is created. Prior to this description is a brief description of a conventional pilot reference aircraft coordinate system (FIG. 10) and one type of structure permutation nomenclature suitable for use in describing aircraft component locations (FIG. 11A and B).

Figure 10:
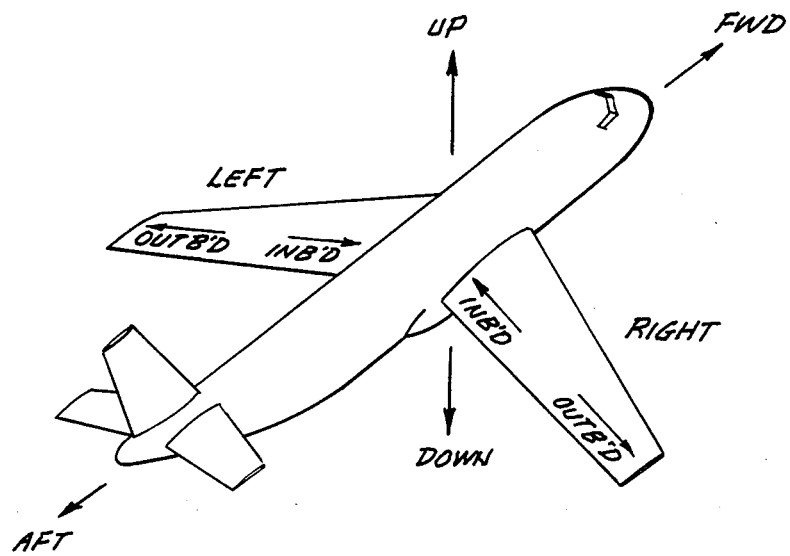
FIG. 10 is a pictorial diagram illustrating a pilot reference aircraft coordinate system.
Figure 11A:
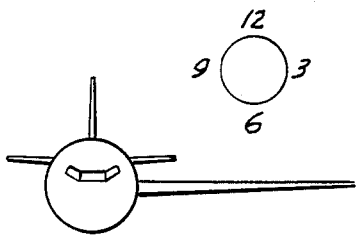
FIG. 11 A and B are pictorial diagrams illustrating one type of structure permutation nomenclature suitable for use by the invention.
Figure 11B:
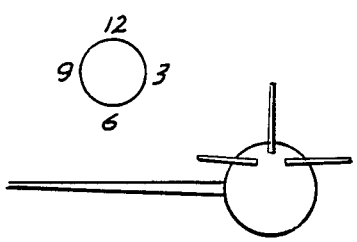

As shown in FIG. 10, a conventional pilot reference aircraft coordinate system uses the term forward (fwd) when looking toward the nose of an airplane and aft when looking toward the tail of the airplane. Up and down are used when looking vertically upwardly and downwardly, respectively. At a position amid the wing inboard (inbd) refers to looking toward the airplane fuselage and outboard (outbd) refers to looking away from the airplane fuselage. As shown in FIGS. 11A and 11B, when the pilot reference aircraft coordinate system is combined with a clock dial reference system and structure nomenclature, a system of rules defining all possible permutations of shim site locations and probe insertion directions is created. In the case of FIGS. 11A and 11B, the rules are used to define shim sites and probe insertion directions for the the left front and rear spars of a Boeing 757 aircraft. The rules allow the controller to retrieve shim profile and other stored data for each site and orient the shim gradient in the manner described below.

A gap can be conceptually viewed as bounded by an imaginary rectangular prism. The orientation of the prism can be described and labels applied to each face. As shown in FIG. 10 and described above, in an aircraft environment, orientation directions corresponding to the orientation of a completed airplane can be chosen—upper, lower, inboard, outboard, forward and aft. These orientation direction labels for a prism associated with each gap to be shimmed are stored in a shim site data base memory that forms part of the cell controller 57.

While knowing the aircraft orientation direction of a shim is necessary for interpreting gap measurements, a more abstract labeling, illustrated in FIG. 12, arbitrarily associated with any prism is more valuable for purposes of defining a shim contour. The abstract labeling illustrated in FIG. 12 defines the shim prism as having a top, backing, 12:00, 3:00, 6:00 and 9:00 o'clock positions. If the backing is always chosen to correspond to the solid member side of the gap to be measured, one of the sides is automatically defined for the shimming technician. The physical constraints of most gaps will typically force the shimming technician to measure the gap from a particular direction. This direction will correspond to one of the aircraft directions (e.g., inboard), which, as shown in FIGS. 11A and 11B, also corresponds to a clock position. As a result, the opposite side of the approach direction will automatically become known (e.g., outboard). If the back side of the probe is always placed against the major structure side of the gap during measurement, aircraft labeling for the top and backing surfaces is readily determined from the shim site data stored in the cell controller memory. As a result, only one labeling for the remaining surface is consistent with the stored shim site data. Thus, the association between abstract and aircraft labeling is readily accomplished by the shimming technician's performing two steps—placing the back side of the probe against the major structure side of the gap and advising the cell controller of the insertion direction via the CDU.

In order for the cell controller to generate the numerical control instructions necessary to create a shim, the cell controller must know the location of the center of the probe in the gap since knowledge of the position of the center, inherently provides knowledge of the position of the measurement points, $x_1$, $y_1$; $x_2$, $y_2$; and $x_3$, $y_3$. Probe position data is supplied to the cell controller by the shimming technician via the CDU that forms part of the data acquisition unit. As illustrated pictorially in FIG. 13, the reported probe position data includes: (i) the depth, D, that the probe center, C, is inserted; and, (ii) the amount, S, the right edge of the probe is shifted from one edge of the gap. Preferably, the probe 81 is inscribed with scale markings. As a result, the shimming technician can read the value of D directly from the probe. The shift value, S, can be determined by visual estimate or by measuring the distance of the right edge of the probe from a predetermined edge of the gap. The distance between the center of the probe, i.e., from the edge of the gap can then be determined by adding to the value of S a distance, A, that is equal to one-half the width of the probe. As a result, the position of the center of the probe $X_p$, $Y_p$ is definable in cartesian coordinate values as $X_p = S + A$ and $Y_p = D$, as illustrated in FIG. 13.

Figure 15:
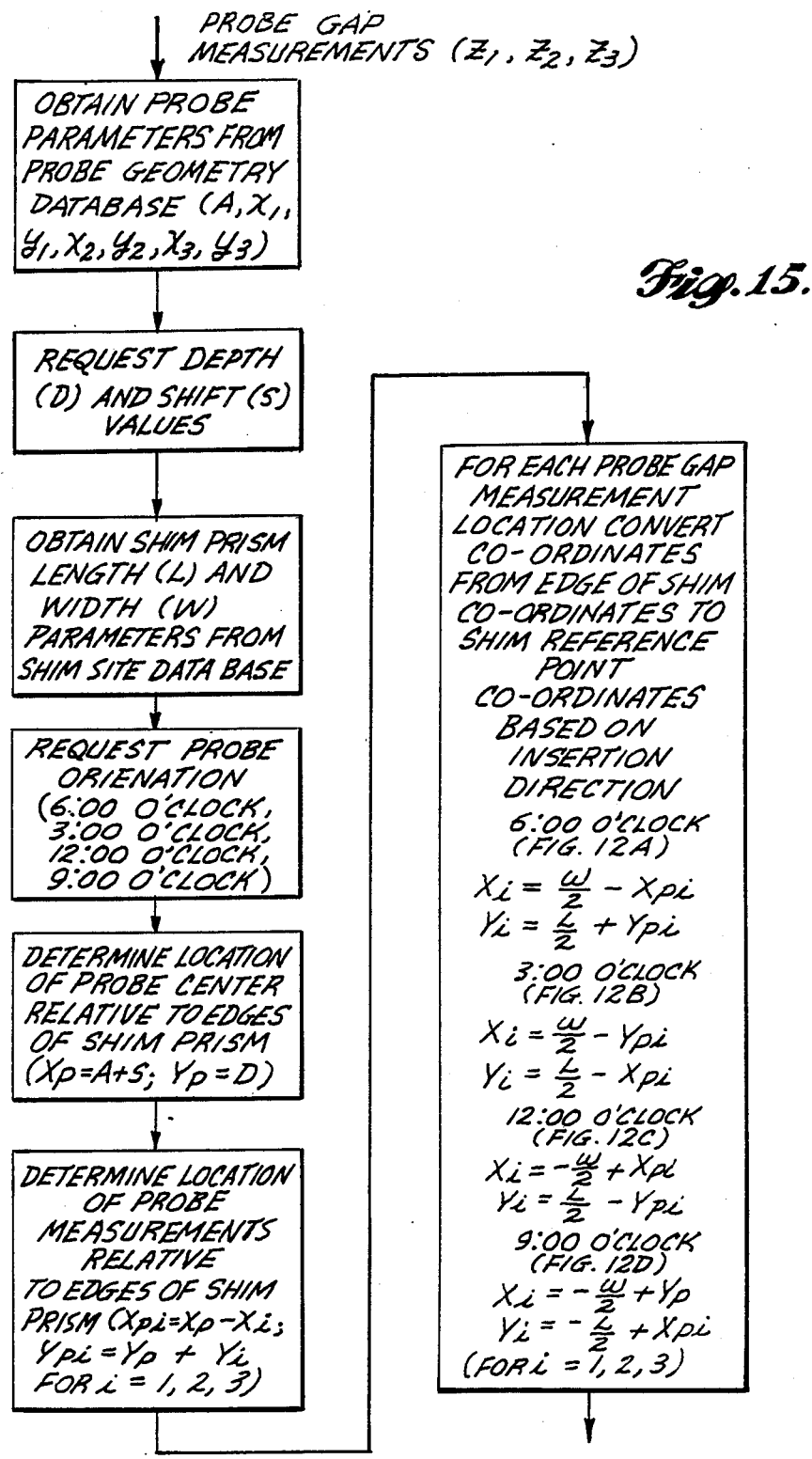
FIG. 15 is a flow diagram illustrating a portion of the operation of the controller of the embodiment of the invention illustrated in FIGS. 3 and 4.
Figure 16:
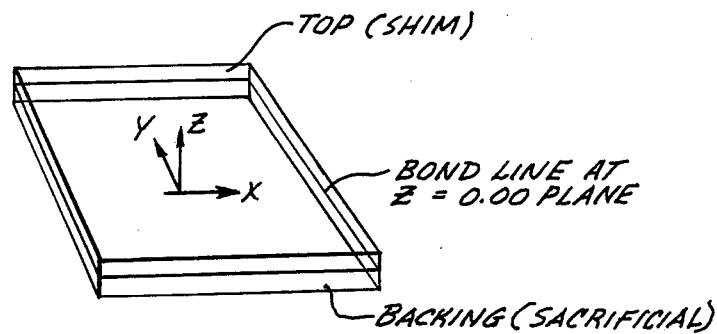
FIG. 16 is a pictorial diagram of a shim blank illustrating the cartesian coordinate orientation utilized by the controller to develop numerical control instructions.

While the foregoing calculations determine the position of the center of the probe with respect to two sides of the bounding prism, because the location of two sides can vary, it is necessary to change coordinate relationships from the edges of the prism to a common reference point within the prism. In accordance with this invention, the reference point is chosen to lie on the bottom surface of the prism, in the center of the rectangle defined by the bottom surface. FIGS. 14A–14D, pictorially illustrate that the coordinate transformation equations depend upon the probe insertion direction. FIG. 5 is a flow diagram illustrating how the cell controller converts edge of shim coordinates to shim reference point coordinates based on insertion direction for each of the three probe measuring positions $x_1$, $y_1$; $x_2$, $y_2$; and $x_3$, $y_3$. The first step illustrated in FIG. 15 is to obtain the probe parameters from a probe geometry data base stored in the memory of the cell controller 57. These parameters are: the width of the probe; A; and the position of the measuring points, $x_1$, $y_1$; $x_2$, $y_2$; and $x_3$, $y_3$ relative to the wave spring center, C, of the probe. Then the operator is requested to insert the probe depth, D, and shift, S, values via the data acquisition CDU. Next the cell controller obtains shim prism length, L, and width, W, parameters from a shim site data base stored in the memory cell controller. That is, the cell controller memory includes a data base that stores the length and width values of a series of prisms. This memory is read by the controller.

Next, the shimming technician is requested to insert the probe orientation direction (6:00 o'clock, 3:00 o'clock, 12:00 o'clock or 9:00 o'clock) via the data acquisition CDU. Next, the cell controller determines the location of the probe center relative to the edge of the shim prism using the formula set forth above—$X_p = A + S$ and $Y_p = D$. Then, the cell controller determines the location of the probe measurements relative to the edges of the shim prism using the formula $X_{pi} = X_p - x_i$ and $Y_{pi} = Y_p + y_i$, for $i = 1, 2$ and $3$. As will be readily appreciated, these formulas determine the position of the probe measurement points with respect to the edges of the shim prism. Next, the coordinates of each probe measurement location are converted from edge of shim coordinates to shim reference point coordinates based on insertion direction. For insertion in the 6:00 o'clock direction, the formulas are as follows:

$$X_i = \frac{W}{2} - X_{pi} \quad (1)$$

$$Y_i = -\frac{L}{2} + Y_{pi} \quad (2)$$

$$(i = 1, 2, 3)$$

For insertion in the 3:00 o'clock direction, the formulas are as follows:

$$X_i = \frac{W}{2} - Y_{pi} \quad (3)$$

$$Y_i = \frac{L}{2} - X_{pi} \quad (4)$$

$$(i = 1, 2, 3)$$

For insertion in the 12:00 o'clock direction, the formulas are as follows:

$$X_i = -\frac{W}{2} + X_{pi} \quad (5)$$

$$Y_i = \frac{L}{2} - Y_{pi} \quad (6)$$

$$(i = 1, 2, 3)$$

For insertion in the 9:00 o'clock direction, the formulas are as follows:

$$X_i = -\frac{W}{2} + Y_{pi} \quad (7)$$

$$Y_i = -\frac{L}{2} + X_{pi} \quad (8)$$

$$(i = 1, 2, 3)$$

In order for the foregoing calculations to be better understood, an example is next set forth. In this example the calibrated measurements made by the shim gap probe at the probe measurement points are: $Z1=0.068$ inches; $Z2=0.064$ inches; and $Z3=0.055$ inches, where $Z1$, $Z2$ and $Z3$ are measurements made at measurement points $x_1$, $y_1$; $x_2$, $y_2$; and $x_3$, $y_3$, respectively; the probe geometry data base contains the following probe parameters: $A=0.550$ inches; $x_1=-0.3248$ inches; $y_1=-0.1875$ inches; $x_2=0.3248$ inches; $y_2=-0.1875$ inches; $x_3=0.00$ inches; and $y_3=0.375$ inches; the shimming operator specifies that $D=1.05$ inches and $S=0.25$ inches; the shim site data base gives the following gap information: $L=2.4$ inches; and $W=1.8$ inches; and, the shimming operator specifies that the probe is inserted from the outboard side of the gap. Thus, $X_p=0.800$ inches ($X_p=A+S=0.550+0.25=0.800$); and $Y_p=1.050$ inches ($Y_p=D=1.050$). The equations $X_{pi}=X_p-X_i$ and $Y_{pi}=Y_p+Y_i$, for i equals 1, 2 and 3, determined the following values: $X_{p1}=1.1248$ inches; $Y_{p1}=0.8625$ inches; $X_{p2}=0.4752$ inches; $Y_{p2}=0.8625$ inches; $X_{p3}=0.800$ inches; and $Y_{p3}=1.425$ inches. Since the probe was inserted from the outboard side of the gap, which the controller associates with the 3:00 o'clock edge of the shim, equations (3) and (4) are used to convert the edge of shim coordinates (i.e., the $X_{pi}$, $Y_{pi}$ coordinates, for i=1, 2, 3) to shim reference point coordinates $X_i$, $Y_i$ coordinates, for i=1, 2, 3. When this is done the following table of values is produced:

| | | |
|---|---|---|
| $X_1 = .0375$ | $X_2 = .0375$ | $X_3 = -.525$ |
| $Y_1 = .0752$ | $Y_2 = .7248$ | $Y_3 = .400$ |
| $Z_1 = .068$ | $Z_2 = .064$ | $Z_3 = .055$ | where all of the table values are in inches.

Figure 17:
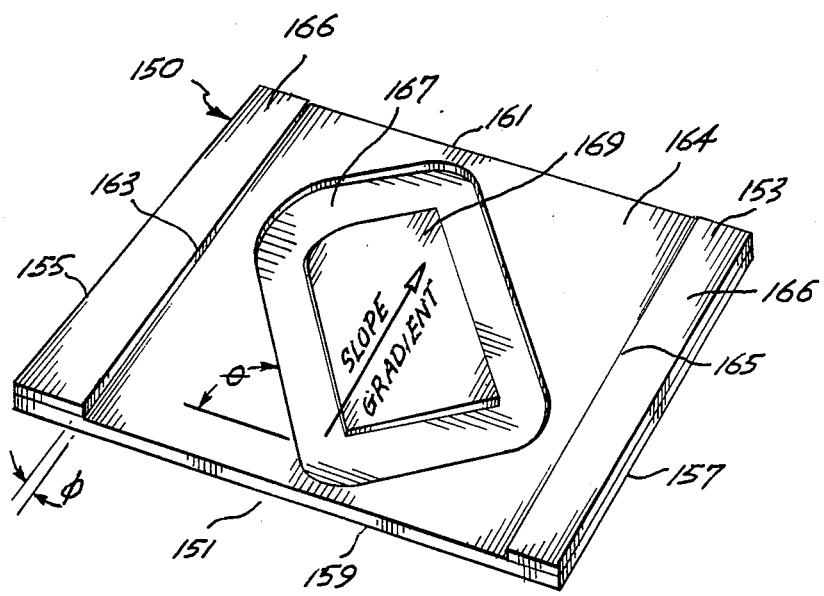
FIG. 17 is a pictorial diagram of a shim cut in a shim blank prior to the removal of the shim from the shim blank.
Figure 18:
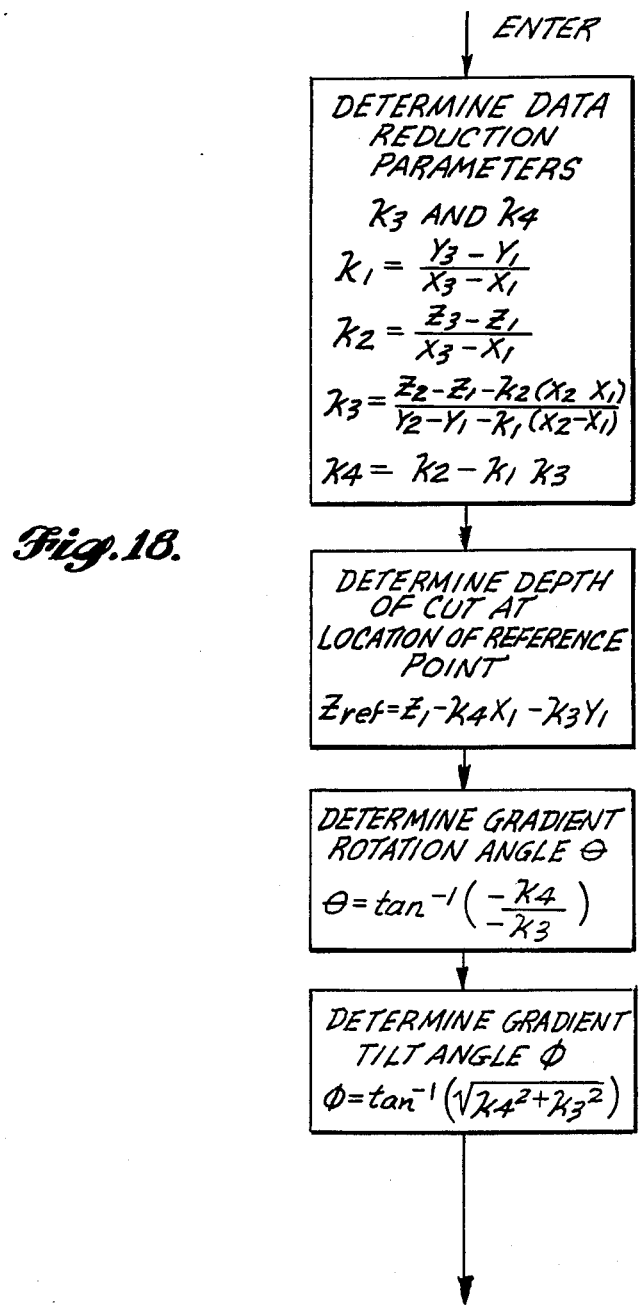
FIG. 18 is a flow diagram illustrating another portion of the operation of the controller of the embodiment of the invention illustrated in FIGS. 3 and 4.

As will be readily appreciated from the foregoing description, at this point, the cell controller has converted measurement location coordinates from edge of shim coordinates to shim reference point coordinates based on the insertion direction. In accordance with the invention, this data is utilized to determine the depth of cut at the reference point (center) of the shim planform and the depth of cut gradient ($\phi$) associated with the direction of the most rapid change in shim thickness. The data is also used to determine how to rotate the shim so that it's gradient direction coincides with the direction of movement of the cutting element of the numerically controlled machine tool. As shown in FIG. 17, gradient rotation angle is denoted $\theta$. As shown in FIG. 18, the first step in this sequence is to calculate the value of two data reduction parameters designated $k_3$ and $k_4$, which are based on the $X_i$, $Y_i$ and $Z_i$ values determined in the manner described above, for i=1, 2 and 3. The values of $k_3$ and $k_4$ are best determined by first determining the values of two other parameters $k_1$ and $k_2$ and substituting the result in the equations that determine the values of $k_3$ and $k_4$. More specifically, the $k_1$, $k_2$, $k_3$ and $k_4$ values are calcualted using the following formulas:

$$k_1 = \frac{Y_3 - Y_1}{X_3 - X_1} \quad (9)$$

$$k_2 = \frac{Z_3 - Z_1}{X_3 - X_1} \quad (10)$$

$$k_3 = \frac{Z_2 - Z_1 - k_2(X_2 - X_1)}{Y_2 - Y_1 - k_1(X_2 - X_1)} \quad (11)$$

$$k_4 = k_2 - k_1 k_3 \quad (12)$$

As will be readily appreciated by those skilled in the NC machine tool art: $k_1$, equals the change in y with respect to x; $k_2$ equals the change in the z with respect to x; $k_3$ equals the slope of the trace of the intersection of the skewed plane on the y-z plane; and, $k_4$ equals the slope of the trace of the intersection of the skewed plane on the x-z plane.

Next, the depth of cut, $Z_{ref}$, at the reference point, (i.e., the center) of the shim planform is determined using the following formula:

$$Z_{ref} = Z_1 - k_4 X_1 - k_3 Y_1 \quad (13).$$

This depth formula treats Z values as a function of X and Y values. The gradient of this function is:

$$\nabla Z(X, Y) = k_4 i + k_3 j \quad (14).$$

The gradient gives the direction in the X-Y plane associated with the most rapid change in shim thickness. An alternative representation of the gradient is useful for controlling a machine tool. The alternative involves a "rotation" gradient angle denoted above as, $\theta$, which can be determined using the following formula:

$$\theta = \tan^{-1} \frac{-k_4}{-k_3} \quad (15)$$

The gradient rotation angle, $\theta$, defines how much the shim plan form must be rotated above the origin in the X-Y plane to point the gradient in a predetermined (Y) direction, which direction is determined by the cutting direction of the machine tool. The signs of the terms of the equation (15) are used to determine the quadrant of the inverse tangent (i.e., $\tan^{-1}$) function.

The only additional item needed to provide all of the information necessary to determine the slope to be cut is the gradient tilt angle, $\phi$. In accordance with the invention, $\phi$ is determined using the following equation:

$$\phi = \tan^{-1}(k_4^2 + k_3^2)^{\frac{1}{2}} \quad (16).$$

The gradient tilt angle describes how far the sloped shim surface is "rotated" away from a level orientation.

Figure 19:
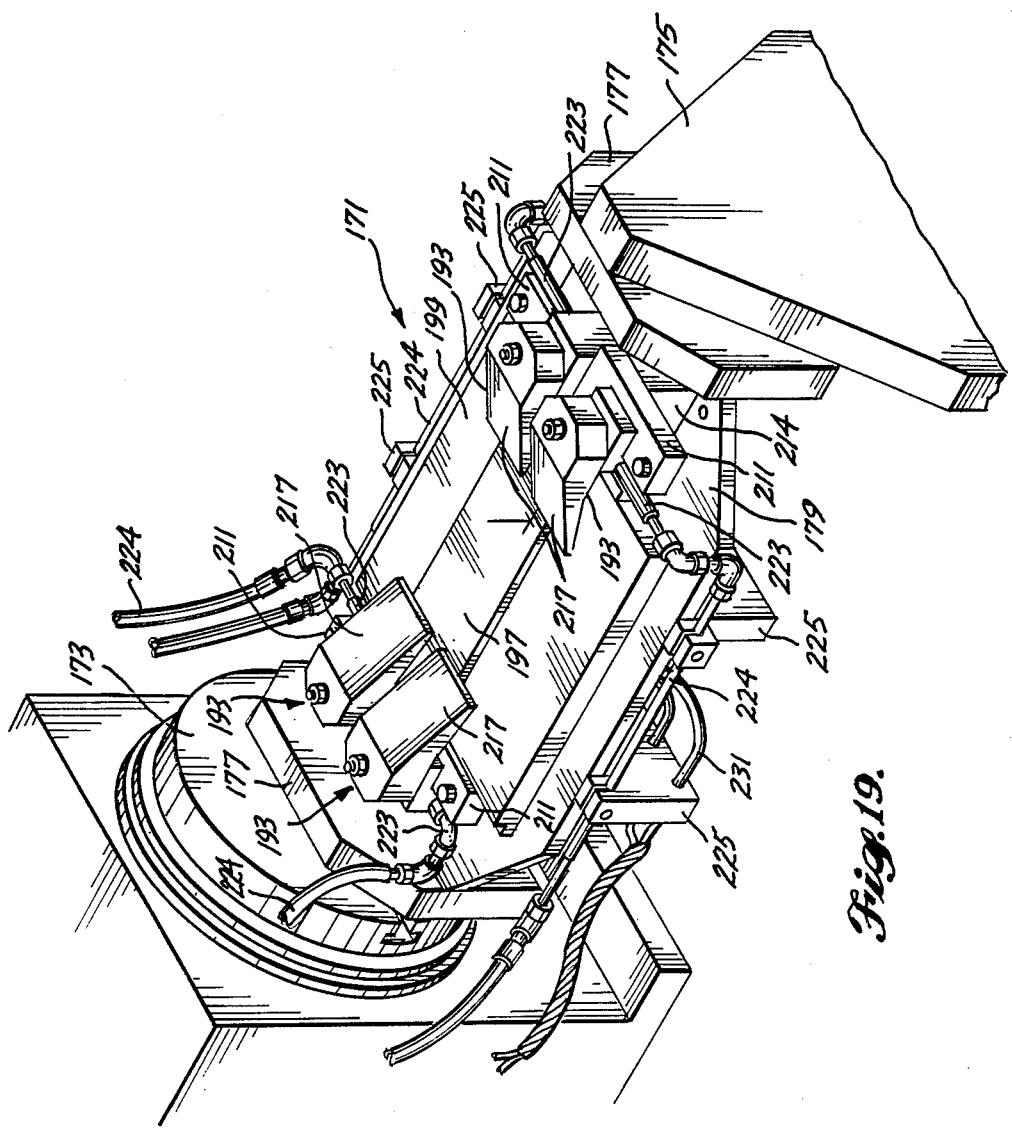
FIG. 19 is a pictorial diagram of a numerically controlled machine tilt table formed in accordance with the invention.

FIG. 17 is a pictorial view illustrating a shim blank 150 oriented and cut based on the foregoing calculations. More specifically, the shim blank 150 illustrated in FIG. 17 includes a base layer 151 and a shim layer 153 adhesively attached to the base layer. The shim blank 150 has a rectangular planform that includes a pair of end edges 155 and 157 and a pair of side edges 159 and 161 as well as a top and bottom. Located inwardly from the end edges 155 and 157 are a pair of transverse parallel lines 163 and 165 created by a face milling operation that, in combination with the side edges 159 and 161, define the shim planform available area 164. The regions 166 between the shim planform area 164 and the end edges 155 and 157 form clamp margins that are used to clamp the shim blank to the table of a milling machine as illustrated in FIGS. 17, 18 and 19 and described below. Thus, the shim blank area is equal to the shim planform area (determined by the maximum shim diagonal), plus two clamp margins, plus an amount equal to twice the diameter of the milling tool to be used to cut the shim profile, plus any necessary clearance value (e.g. 0.125 inch). The direction of gradient cutting parallels these end edges and lies between the transverse parallel lines 163 adn 165. The cut direction has a slope, i.e., has a gradient tilt angle $\phi$, which is determined in accordance with equation 16. After the slope has been cut the forth axis tilt ($\phi$) is returned to zero (i.e. level) and, using a suitable diameter end mill, the profile 167 of the shim is machined through the shim layer 153 into the base layer 151. The adhesive that attaches the shim layer 153 to the base layer 151 is chosen to allow the shim 169 to be pealed away from the shim base 151 just prior to installation.

Figure 20:
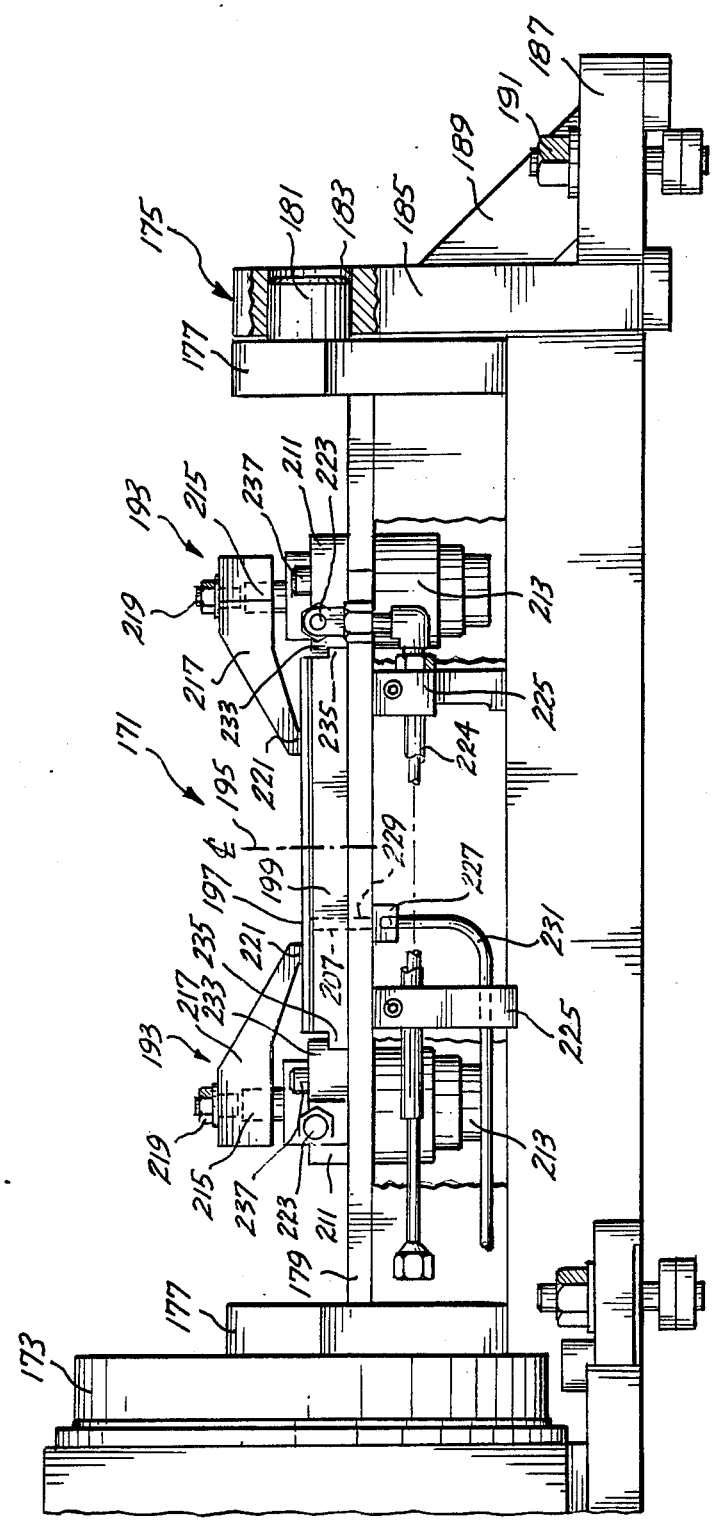
FIG. 20 is a side elevational view of the tilt table illustrated in FIG. 19 in one position.
Figure 21:
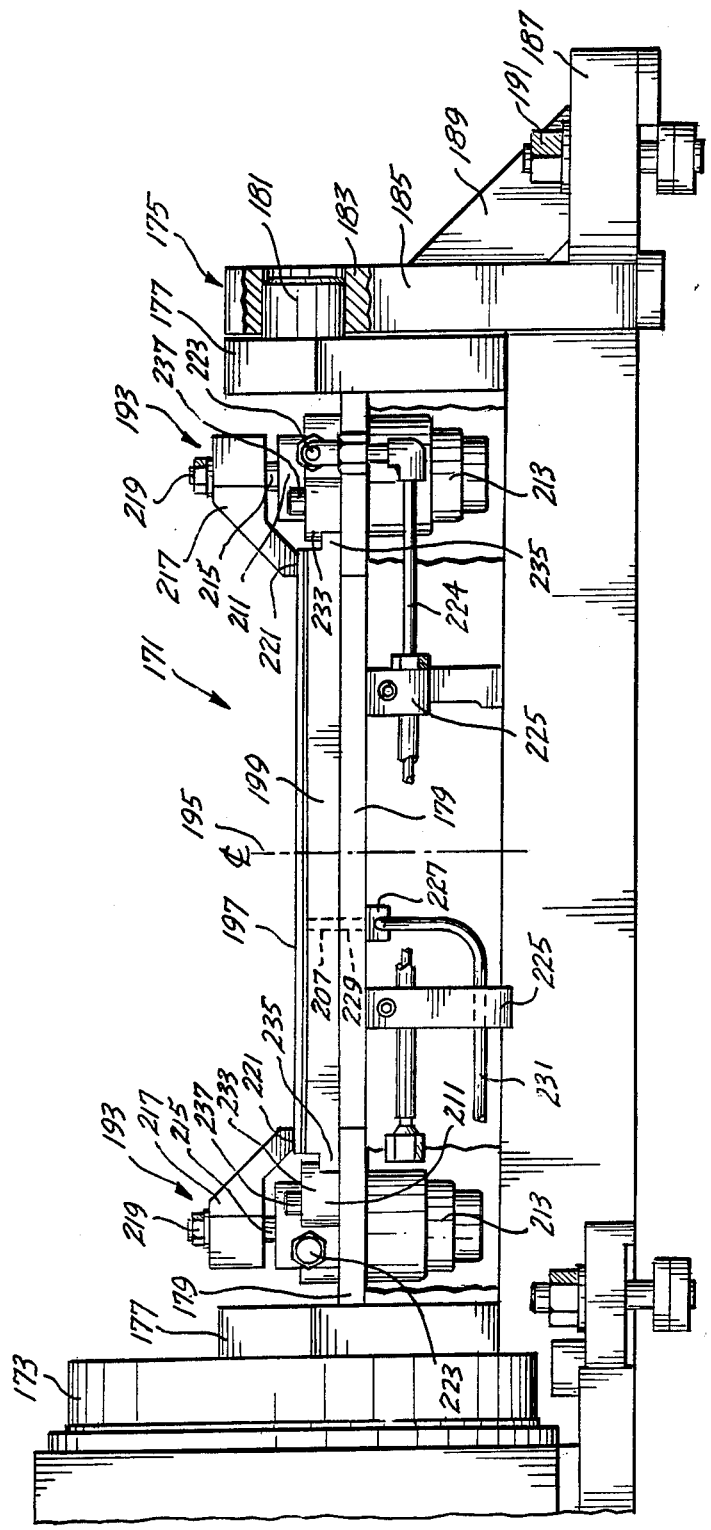
FIG. 21 is a side elevational view of the tilt table illustrated in FIG. 19 in a second position.

The preferred numerically controlled machine tool for cutting a shim in the manner illustrated in FIG. 17 is a vertical milling machine. As noted above, one suitable vertical milling machine is the MAZAK VQC 15/40 produced by Yamazaki Corporation. When a generally horizontally oriented tilt table 171 of the type illustrated in FIGS. 19-21 is combined with a suitable vertical milling machine a numerically controlled machine tool suitable for use in the embodiment of the invention illustrated in FIGS. 3 and 4 is provided. As will be better understood from the following description, the tilt table 171 is designed to support a variety of different sized shim blanks. Further, since the tilt table lies generally horizontal, the tilt table lies transverse to the vertical axis of rotation of the cutting element of a vertical milling machine.

As illustrated best in FIG. 19, the tilt table 171 is mounted between the tilt axis head 173 of the vertical milling machine and a support bracket 175. The tilt axis head 173 includes a large circular plate mounted for rotation about a horizontal axis of the vertical milling machine. The support bracket 175 rotatably supports the end of the tilt table 171 remote from the tilt axis head 173. As a result, as the tilt axis head 173 is rotated, the inclination or tilt of the tilt table 171 is varied in a direction lying orthogonal to the horizontal rotation axis defined by the head 173.

The tilt table 171 includes a pair of vertical end walls 177 and a generally horizontal plate or table 179 that is affixed to and lies between the end walls 177. The end walls are trunion mounted. More specifically, extending outwardly from each end wall 177 is a shaft 181. (See FIGS. 20 and 21). One shaft 181 is rotatably mounted in a cylindrical aperture 183 formed in a vertical plate 185 that forms a portion of the support bracket 175. The other end walls is keyed and bolted to the tilt axis head 173.

In addition to the vertical plate 185, the support bracket 175 includes a horizontal bar 187 located at the lower end of the vertical plate 185 and several, e.g., two or more, inclined legs 189 that extend between the bar 187 and the vertical plate 185. Preferably, the vertical plate 185, the bar 187 and the inclined legs 189 are all formed of steel welded together. The bar 187 is attached to a suitably rigid horizontal support surface (not shown) by a plurality of bolts 191.

The table 179 supports four clamp assemblies 193 that are movable between inner and outer fixed positions with respect to the centerline 195 of the table 179 lying between the end walls 177. FIGS. 19 and 20 illustrate the clamp assemblies 193 in their inner position and FIG. 21 illustrates the clamp assemblies 193 in their outer position.

The clamp assemblies 193 clamp both shim stock blanks 197 and pneumatic manifolds 199 to the table 179. More specifically, positioned atop of the table 179, in the center thereof, is a pneumatic manifold 199 of the type illustrated in FIGS. 22 and 23 and described below. Positioned atop the pneumatic manifold is a shim stock blank. The clamp assemblies clamp the shim stock blank and the underlying pneumatic manifold to the table 179.

Figure 22:
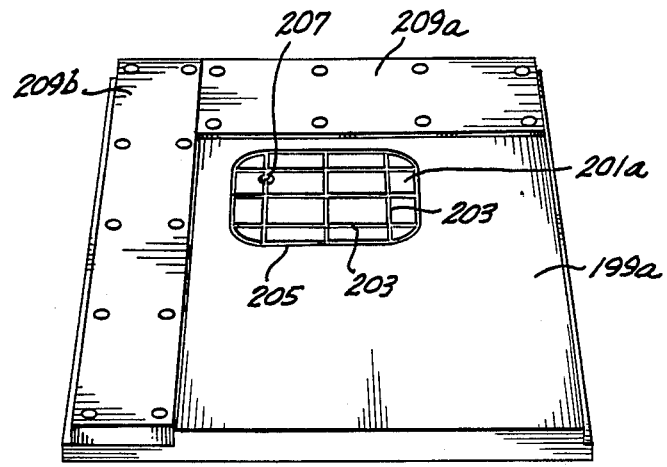
FIG. 22 is a pictorial diagram of a vacuum manifold suitable for use with the tilt table illustrated in FIGS. 19-21.
Figure 23:
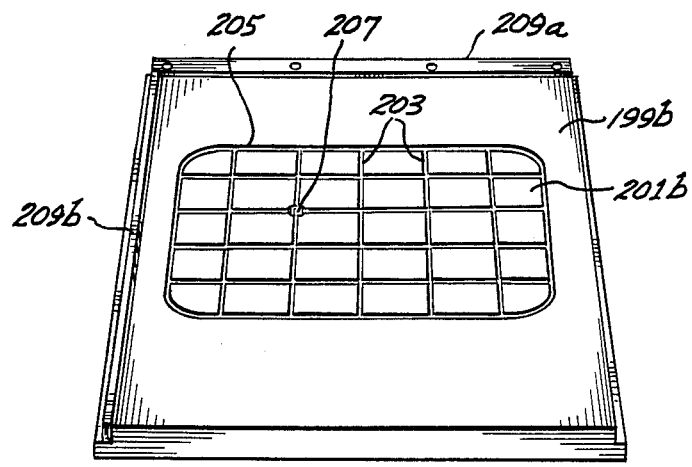
FIG. 23 is a pictorial diagram of a alternative embodiment of a vacuum manifold suitable for use with the tilt table illustrated in FIGS. 19-21.

The size and configuration of the pneumatic manifold 199 depends upon the position of the clamp assemblies 193 and the size of the shim stock blank 197 to be machined. FIGS. 22 and 23 illustrate two differently configured pneumatic manifolds 199a and 199b both sized for use when the clamp assemblies 193 are in their inner position. The pneumatic manifolds 199a and 199b comprise a thick, flat plate formed of a suitably rigid material, such as aircraft grade aluminum or steel. Located in the center of each of the pneumatic manifolds 199a and 199b is a grid 201a and 201b. The grids 201a and 201b are formed by a plurality of transverse slots 203 surrounded by a rectangular peripheral slot 205 having curved corners. An O-ring seal is mounted in the rectangular peripheral slot 205. An inlet hole 207 that extends through the plate that forms the pneumatic manifolds 199a and 199b intersects one or more of the transverse slots 203. As a result, when a source of pneumatic air is connected to the inlet hole 207 from the opposite side of the pneumatic manifold 199a or 199b from the slotted side and, a shim stock blank that entirely covers the grid 201a or 201b, is placed over the grid, the shim stock blank is pulled tightly against the pneumatic manifold 199a or 199b. Preferably, the positioning of a shim stock blank atop a penumatic manifold 199a and 199b is determined by placing one corner of a rectangular shim stock blank against stops 209a and 209b located along two intersecting edges of the upper surface of the pneumatic manifolds 199a or 199b. A manifold that is larger, but similarly formed to those illustrated in FIGS. 22 and 23 is mounted atop the table 179 when the clamp assemblies are in their outer position (FIG. 21).

The four clamp assemblies 193 include two support brackets 211. One support bracket and, thus, two clamp assemblies are located on each side of the centerline 195 of the table 179. Further, the clamp assemblies located on each side of the centerline are located on opposite sides of the table axis of rotation. In essence, the clamp assembly positions define a rectangle centered at the center of the table 179.

The support brackets 211 are attached to the table 179 and define the inner and outer positions of the clamp assemblies 193. More specifically, the support brackets 211 can be affixed to the table 179 at inner positions (FIGS. 19 and 20) or outer positions (FIG. 21). In the inner position, the brackets 211 and, thus, the clamp assemblies are nearer to the table centerline 195 than they are in the outer position.

The support brackets 211 support the housings 213 of hydraulic actuators, which extend downwardly through holes 214 in the table 179. The shafts 215 of the hydraulic actuators 213 are vertically oriented and extend upwardly. Mounted atop each of the shafts 215 is a dog leg shaped arm 217. One leg of the dog leg shaped arm 217 is attached to the upper end of the vertically oriented shafts 215 of the hydraulic actuators 211 in any suitable manner, such as by nuts 219 threaded onto the upper ends of the shafts 215. The other legs of the dog leg shaped arms 219 project inwardly and downwardly such that the inner tips 221 of the legs rest on a shim stock blank 197 lying atop a pneumatic manifold 199 which, as described above, is mounted atop the table 179. Hydraulic power is applied to the hydraulic actuators 211 via inlets 223 connected by hydraulic lines 224 to hydraulic valves (not shown) that, in turn, are connected to a source of hydraulic fluid (not shown). As required, the hydraulic lines 224 are slidably supported by brackets 225 attached to the bottom of the table 179. The slidable support allows the clamp support brackets 211 to be positioned at their inner and outer positions, as required. Further, attached to the bottom of table 179 is an inlet fixture 227 that includes a vertical hole 229 sized and positioned to mate with the holes 207 in the manifolds 199a and 199b (FIGS. 22 and 23). The fixture 227 connects the hole 229 to a vacuum line 231 that is connected to pneumatic control valves (not shown) that, in turn, are connected to a suitable vacuum source.

In addition to supporting the hydraulic actuators 211 and their associated dog leg shaped arms 217, the clamp support brackets 211 also clamp the chosen manifold 199 to the top of the table 179 afer the hole 207 in a manifold 199 has been aligned with the hole 229 in the inlet fixture 227. Preferably, alignment is accomplished by a pair of alignment pin/hole assemblies that align the manifold 199 to the table 179. Clamping is accomplished by short flanges 233 located along the upper edges of the facing sides of the clamp support brackets 211, as shown in FIGS. 20 and 21. The flanges 233 overlie manifold flanges 235 located along the lower sides of the adjacent edges of the manifold 199. The sizing of the flanges is such that when the clamp support brackets 211 are clamped by bolts 237 to the table 179, the manifold 199 is firmly attached to the table 179.

In operation, the cell controller initializes the system by commanding the numerically controlled machine tool to place the table 179 in a horizontal position and to release the dog leg shaped arms 217 by preventing hydraulic pressure from being applied to the hydraulic actuators 213, which allows an internal spring to raise the dog leg shaped arms 217. The cell controller also causes the numerically controlled machine tool to prevent the application of vacuum to the manifold 199. Thereafter, an operator positions a shim stock blank into the corner (upper left as shown) of the pneumatic manifold so that the blank is touching the shim blank-stops 209a and 209b along edges 101 and 155. Then, the cell controller causes the numerically controlled machine tool to apply hydraulic pressure to the hydraulic actuators 213 of the clamp assemblies 193. As a result, the dog leg shaped arms 217 rotate over the shim blank and are pulled downwardly, whereby pressure is applied by the tips 221 of the dog leg shaped arms 217 to the shim stock blank 197. Simultaneously, or shortly thereafter, the cell controller causes the numerically controlled machine tool to apply vacuum to the manifold 199. Next, the cell controller commands the numerically controlled machine tool to rotate the table 179 to the correct gradient angle, $\theta$. Then, the cutting tool of the numerically controlled machine tool, which rotates about a vertical axis overlying the cable 179, is energized. The cutting tool (face mill) is moved back and forth along a path that lies transverse to the rotation axis of the table 179. The motion is such that the shim stock blank is cut in the region between the tips 221 of the dog leg shaped arms 217. More specifically, as shown in FIG. 17 and discussed above, the shim stock blank is cut in the region between a pair of transverse parallel lines 163 and 165. Depending upon the depth of cut, one set of back and forth indexed passes may be adequate to create the desired slope, or several sets of back and forth indexed passes, along with a drop in cutter height between each set, may be required. In any event, after the slope is cut, the profile of the shim is cut by changing cutters to an end mill of suitable diameter and moving it along a path of travel defined by the desired shim profile. The end result is a shim that remains attached to the base stock. Simultaneously, a printer (not shown) prints a label that identifies the location of the shim. The location information may include a particular airframe number as well as the specific location of the shim in the airframe, plus other relevant and desired information.

As will be readily appreciated from the foregoing description, the invention provides a system for automatically manufacturing shims suitable for use between the structural components of an airframe or other structure. While the preferred embodiment of the invention has been illustrated and described, it is to be understood that within the scope of the appended claims various changes can be made therein without departing from the invention. For example, shim gap probes other than the one described in U.S. Pat. No. 4,649,752 and illustrated in FIG. 5 can be utilized, if desired. Further, various types of calibration subsystems designed to calibrate specific type probes other than the one specifically described herein can be utilized, if desired. Similarly, milling machines other than the one specifically described herein can be utilized in an actual embodiment of the invention.

The embodiments of the invention to which an exclusive property or privilege is claimed are defined as follows:

1. An automated shim manufacturing system comprising:
    a data acquisition unit for measuring a gap to be shimmed, producing data defining the thickness of said gap to be shimmed and transmitting said data to a cell controller;
    a cell controller coupled to said data acquisition unit for receiving said data defining the thickness of said gap to be shimmed produced by said data acquisition unit and producing numerical control instructions based on said data; and,
    a numerically controlled machine coupled to said cell-controller for receiving said numerical control instructions and using said instructions to cut a shim from a shim blank sized to fit said gap to be shimmed.

2. An automated shim manufacturing system as claimed in claim 1, wherein said data acquisition unit includes a shim gap probe suitable for insertion into a gap to determine the thickness of said gap.

3. An automated shim manufacturing system as claimed in claim 2, wherein said shim gap probe measures the thickness of said gap at at least three spaced-apart locations whose position with respect to a center location is known.

4. An automated shim manufacturing system as claimed in claim 3, wherein said cell-controller manipulates the gap measurement information produced by said shim gap probe to determine the gradient of the gap to be shimmed, and wherein said numerical control instructions orient said gradient such that it lies transverse to the axis about which said tiltable table tilts.

5. An automated shim manufacturing system as claimed in claim 4, wherein said cell-controller determines a depth of cut at a reference location.

6. An automated shim manufacturing system as claimed in claim 5, wherein said reference location is the center of a shim blank.

7. An automated shim manufacturing system as claimed in claim 5, wherein said data acquisition unit includes a control display unit (CDU) for an operator to introduce probe position data denoting the position of said shim gap probe in a gap and wherein said data acquisition unit transmits said probe position data introduced by an operator via said control display unit to said cell controller.

8. An automated shim manufacturing system as claimed in claim 7, wherein said cell-controller determines said reference location based on the gap measurements made by said shim gap probe and said probe position data introduced by an operator via the CDU of said data acquisition unit.

9. An automated shim manufacturing system as claimed in claim 3, wherein said data acquisition unit includes a control display unit (CDU) for an operator to introduce probe position data denoting the position of said shim gap probe in a gap and wherein said data acquisition unit transmits said probe position data introduced by an operator via said control display unit to said cell controller.

10. An automated shim manufacturing system as claimed in claim 9, wherein said numerically controlled machine tool is a vertical milling machine that includes a tiltable, generally horizontally oriented table, and wherein said numerical control instructions produced by said cell-controller controls the tilt angle of said tiltable table and the milling action of the cutting element of said vertical milling machine.

11. An automated shim manufacturing system as claimed in claim 10, herein said tiltable table includes clamp means for clamping a shim blank to the upper surface of said tiltable table so as to lie beneath the cutting element of said vertical milling machine.

12. An automated shim manufacturing system as claimed in claim 11, wherein said clamp means includes mechanical clamps.

13. An automated shim manufacturing system as claimed in claim 12, wherein said mechanical clamps are hydraulically energized.

14. An automated shim manufacturing system as claimed in claim 12, wherein said clamp means further includes a pneumatic clamp.

15. An automated shim manufacturing system as claimed in claim 14, wherein said pneumatic clamp includes a vacuum manifold located beneath a shim blank.

16. An automated shim manufacturing system as claimed in claim 15, wherein said mechanical clamps press the shim blank and said underlying vacuum manifold against the upper surface of said tiltable table.

17. An automated shim manufacturing system as claimed in claim 14, wherein said cell-controller manipulates the gap measurement information produced by said shim gap probe to determine the gradient of the gap to be shimmed, and wherein said numerical control instructions orient the gradient such that it lies transverse to the axis about which said tiltable table tilts.

18. An automated shim manufacturing system as claimed in claim 17, wherein said cell-controller determines a depth of cut at a reference location.

19. An automated shim manufacturing system as claimed in claim 18 wherein said reference location is the center of a shim blank.

20. An automated shim manufacturing system as claimed in claim 18, wherein said cell-controller determines said reference location based on the gap measurements made by said shim gap probe and said probe position data introduced by an operator via the CDU of said data acquisition unit.

21. An automated shim gap manufacturing system as claimed in claim 2, including a calibration system, for calibrating said shim gap probe.

22. An automated shim manufacturing system as claimed in claim 21, wherein said calibration system includes:
a lower table;
an upper table positioned above said lower table such that a gap suitable for receiving a shim gap probe exists between said upper and lower tables; and,
means for tilting said upper table with respect to said lower table.

23. An automated shim manufacturing system as claimed in claim 22, including means for measuring the distance between said upper table and said lower table at spaced apart locations as said upper table is tilted by said tilting means.

24. An automated shim manufacturing system as claimed in claim 23, wherein said upper table and said lower table each have three outwardly projecting legs overlying one another.

25. An automated shim manufacturing system as claimed in claim 24, wherein said tilting means comprises three linear actuators, one positioned near the outer end of each of the legs of said upper table, each of said linear actuators having a vertically oriented shaft whose outer end impinges on the underlying leg of said lower table.

26. An automated shim manufacturing system as claimed in claim 25, wherein said measuring means comprises three linear probes, one of said linear probes mounted in each of the legs of said lower table, said linear probes being vertically oriented and having probe elements positioned to impinge on the overlying undersurface of said upper table.

27. An automated manufacturing system as claimed in claim 26, wherein said calibration system includes a piston mounted in said lower table and a probe table lying atop said piston for receiving a probe to be calibrated.

28. An automated shim manufacturing system as claimed in claim 27, wherein said calibration system further includes a linear actuator mounted and positioned to vertically raise and lower said cylinder and a linear measuring device for measuring the vertical position of said cylinder.

29. An automated shim manufacturing system as claimed in claim 1, wherein said numerically controlled machine tool is a vertical milling machine that includes a tiltable, generally horizontally oriented table, and wherein said numerical control instructions produced by said cell-controller controls the tilt angle of said tiltable table and the milling action of the cutting element of said vertical milling machine.

30. An automated shim manufacturing system as claimed in claim 29, wherein said tiltable table includes clamp means for clamping a shim blank to the upper surface of said tiltable table so as to lie beneath the cutting element of said vertical milling machine.

31. An automated shim manufacturing system as claimed in claim 30, wherein said clamp means includes mechanical clamps.

32. An automated shim manufacturing system as claimed in claim 31, wherein said mechanical clamps are hydraulically energized.

33. An automated shim manufacturing system as claimed in claim 31, wherein said clamp means further includes a pneumatic clamp.

34. An automated shim manufacturing system as claimed in claim 33, wherein said pneumatic clamp includes a vacuum manifold located beneath a shim blank.

35. An automated shim manufacturing system as claimed in claim 34, wherein said mechanical clamps press the shim blank and said underlying vacuum manifold against the upper surface of said tiltable table.

36. A calibration system for calibrating a shim gap probe suitable for measuring a gap at three spaced apart locations, said calibration system comprising:
   a lower table;
   an upper table positioned above said lower table such that a gap suitable for receiving a shim gap probe exists between said upper and lower table; and
   means for tilting said upper table with respect to said lower table.

37. A calibration system as claimed in claim 36, including means for measuring the distance between said upper table and said lower table at spaced apart locations as said upper table is tilted by said tilting means.

38. A calibration system as claimed in claim 37, wherein said upper table and said lower table each have three outwardly projecting legs overlying one another.

39. A calibration system as claimed in claim 38, wherein said tilting means comprises three linear actuators, one positioned near the outer end of each of the legs of said upper table, each of said linear actuators having a vertically oriented shaft whose outer end impinges on the underlying leg of said lower table.

40. A calibration system as claimed in claim 39, wherein said measuring means comprises three linear probes, one of said linear probes mounted in each of the legs of said lower table, said linear probes being vertically oriented and having probe elements positioned to impinge on the overlying undersurface of said upper table.

41. A calibration system as claimed in claim 40, including a piston mounted in said lower table and a probe table lying atop said piston for receiving a probe to be calibrated.

42. A calibration system as claimed in claim 41, further including a linear actuator mounted and positioned to vertically raise and lower said cylinder and a linear measuring device for measuring the vertical position of said cylinder.

* * * * *

UNITED STATES PATENT AND TRADEMARK OFFICE
CERTIFICATE OF CORRECTION

PATENT NO. : 4,848,137

DATED : July 18, 1989

INVENTOR(S) : Turner et al.

It is certified that error appears in the above-identified patent and that said Letters Patent is hereby corrected as shown below:

Column 6, line 16: "ship" should be --shim--
Column 17, line 64: "$\theta$" should be --$\phi$--

Signed and Sealed this

Twenty-fourth Day of July, 1990

Attest:

HARRY F. MANBECK, JR.

*Attesting Officer*      *Commissioner of Patents and Trademarks*